United States Patent [19]

Koike

[11] 4,318,510

[45] Mar. 9, 1982

[54] WASHER SYSTEM FOR AN AUTOMOTIVE VEHICLE

[75] Inventor: Kiyoshi Koike, Yokohama, Japan

[73] Assignee: Nissan Motor Company, Limited, Kanagawa, Japan

[21] Appl. No.: 94,680

[22] Filed: Nov. 15, 1979

[30] Foreign Application Priority Data

Nov. 20, 1978 [JP] Japan ................ 53-159568[U]

[51] Int. Cl.³ ................................ B60S 1/46
[52] U.S. Cl. .................... 239/284 A; 15/250 A
[58] Field of Search .............. 239/284 A; 15/250 A

[56] References Cited

U.S. PATENT DOCUMENTS 3,667,082  6/1972  Hoyler ..................... 15/250 A
4,029,259  6/1977  Ursel ..................... 239/284 A

FOREIGN PATENT DOCUMENTS 2455294  5/1976  Fed. Rep. of Germany ... 239/284 A
2710963  9/1978  Fed. Rep. of Germany ... 239/284 A

*Primary Examiner*—Richard A. Schacher
*Attorney, Agent, or Firm*—Lowe, King, Price & Becker

[57] ABSTRACT

A washer system for an automotive vehicle, comprises a bumper fixed on the body of the automotive vehicle, which has an inner space therein, washer nozzle means provided on said bumper, a washer tank for containing a washing liquid at a predetermined level, a washer pump for supplying the washing liquid from said washer tank to said washer nozzle means, hose means connected via said washer pump between said washer tank and said washer nozzle means for feeding said washing liquid, and means for housing said washer tank, washer pump and hose means in the inner space of said bumper.

12 Claims, 11 Drawing Figures

WASHER SYSTEM FOR AN AUTOMOTIVE VEHICLE

BACKGROUND OF THE INVENTION

This invention relates to a washer system for an automotive vehicle, and more particularly to a structure for housing a washer tank and others of a washer system for an automotive vehicle.

FIG. 1 shows generally the front portion of an automotive vehicle equipped with a plurality of head lamps 1. The corresponding number of washer nozzles 6 are fixed on the top of the front bumper 2 of the automotive vehicle in such a way that each tips of the nozzles 6 face the head lamps 1, respectively. The washing liquid is jetted from the nozzles onto the glass surface of the head lamps 1 so as to make the glass surfaces clean.

In the prior art washer systems as noted above, the washer tank is placed within the engine compartment. For such a reason, the hose for feeding the washing liquid from the washer tank to the nozzles 6 must be very long because the nozzles on the top of the front bumper are far from the engine compartment. It increases the flow resistance of the washing liquid through the hose so that a large capacity of washer pump is required. In addition, because many parts are provided in the engine compartment, there is not enough room for a big washer tank. Thus, the size or volume of the washer tank must be set small, usually.

On the other hand, the front bumper 2 has a channel-shaped cross-section and at its back side a back plate fixed thereto as a stiffener thereby to form a box-shaped space therebetween. This inner space within the front bumper 2 is large in volume. Also, such an inner space in the front bumper is near the washer nozzles 6 on the top of the front bumper 2.

SUMMARY OF THE INVENTION

Accordingly, it is an object of the present invention to provide a washer system for head lamps fitted on the front portion of an automotive vehicle wherein the inner space in a front bumper is effectively utilized for the purpose of housing a washer tank therein, in view of the foregoing.

It is another object of the present invention to provide a washer system for head lamps of an automotive vehicle in which the length of a hose connected between a washer tank and a plurality of washer nozzles may be extremely shortened so as to permit the capacity of a washer pump to be minimized while the volume of the tank may be set as large as possible in the effective inner space in a front bumper.

According to the present invention, there is provided a washer system for an automotive vehicle, comprising a bumper fixed on the body of the automotive vehicle, said bumper having an inner space therein, washer nozzle means provided on said bumper, a washer tank for containing a washing liquid at a predetermined level, a washer pump for supplying the washing liquid from said washer tank to said washer nozzle means, hose means connected via said washer pump between said washer tank and said washer nozzle means for feeding said washing liquid, and means for housing said washer tank and said washer pump in the inner space of said bumper. It is preferable that said washer tank, washer pump and hose means constitute a unit. Also, said housing means preferably comprises a back plate fixed on the back portion of said bumper with a cut portion through which said washer tank and said washer pump is as a unit inserted into the inner space of said bumper. In a preferred form, said cut portion is an opening formed on said back plate. The tank may be fixed on the edge portion of said opening of said back plate. A base plate is fixed on said tank, and said washer pump is fitted through a bracket onto said base plate. According to an aspect of the invention, said washer tank is made of a soft resin.

According to another aspect of the invention, said housing means comprises a base plate on which said washer tank is fixed, and the edge portion of said base plate is fixed to the back edge portion of said bumper. Said tank has at its top a concave portion in which said washer pump is arranged. In this form, the tank may be made of a hard resin.

Said washer nozzle means is fitted on the top of said bumper, facing a head lamp provided at the front of the automotive vehicle body. Said washer nozzle means is fixed at its base portion onto said back plate, and the tip of said washer nozzle means projects through a small hole formed on the top of said bumper and is covered by a hood fitted on the top of said bumper. Otherwise, said washer nozzle means is fitted through a bracket onto the underside of the back edge portion of said bumper.

BRIEF DESCRIPTION OF THE DRAWINGS

These and other objects, features and advantages of the present invention will become more apparent from the following description of the preferred embodiments of the present invention taken in conjunction with the accompanying drawings in which.

DESCRIPTION OF THE PREFERRED EMBODIMENT

Figure 1:
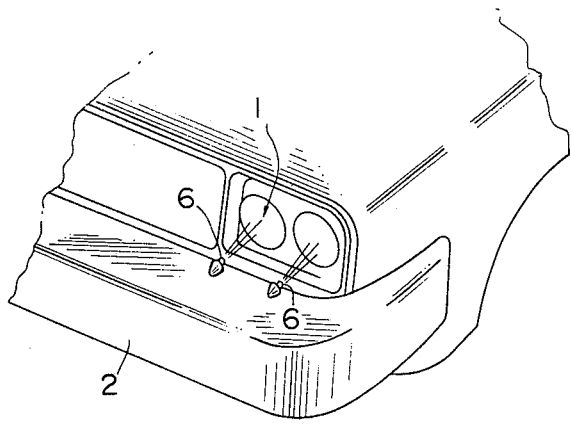
FIG. 1 is a schematic perspective view showing in general partly the front portion of an automotive vehicle.
Figure 2:
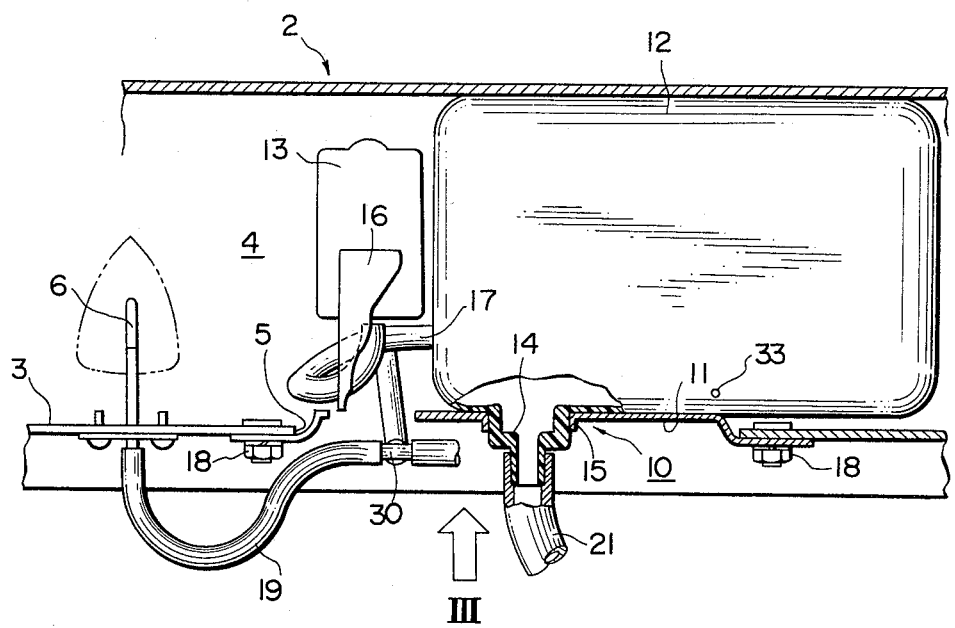
FIG. 2 is a sectional view showing a washer system for an automotive vehicle according to a preferred embodiment of the present invention.
Figure 3:
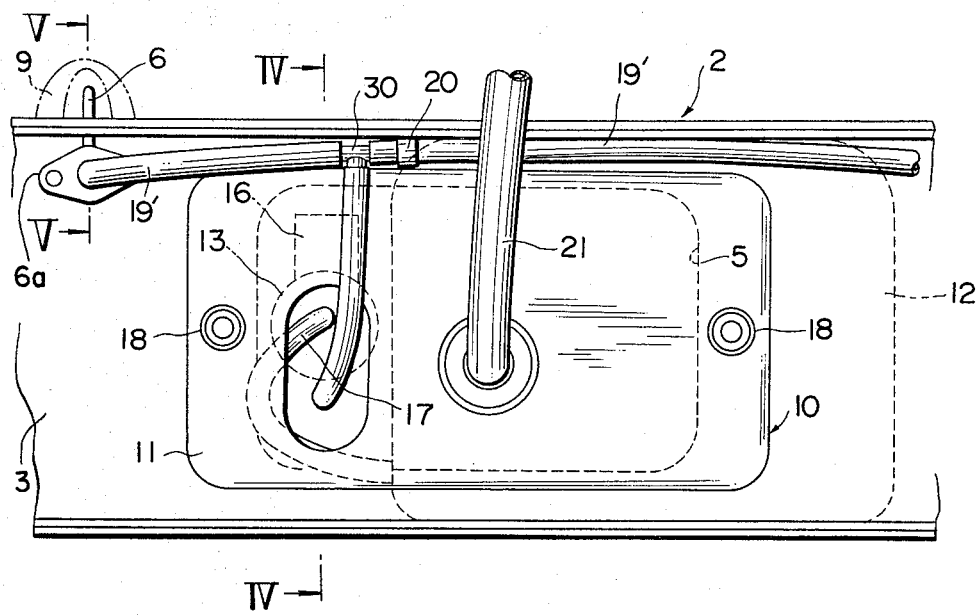
FIG. 3 is a rear view taken from the arrow III in FIG. 2, showing the washer system as shown in FIG. 2.

Referring now to FIGS. 2 to 5, the front bumper 2 is formed in a channel shape. The back plate 3 is fixed on the back side of the front bumper 2 to form the inner space 4 therein. In other words, the front bumper 2 and the back plate 3 are combined like a box, partly. The back plate 3 has at its proper portion an opening 5 through which the tank unit 10 can be inserted into the inner space 4 for the purpose of housing the tank unit 10 therein. In the shown embodiment, the opening 5 is almost rectangular.

Figure 4:
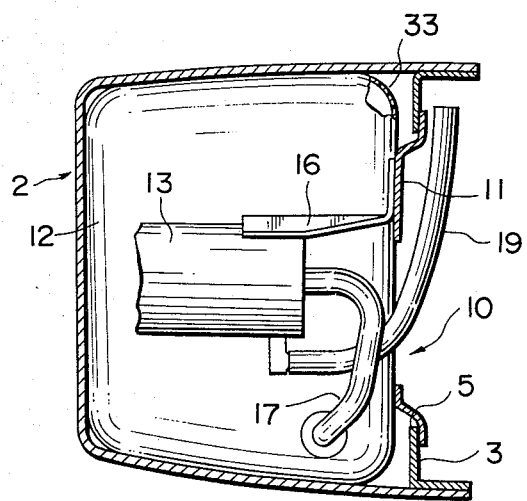
FIG. 4 is a sectional view taken along the line IV—IV in FIG. 3, of the washer system shown in FIG. 3.

The washer tank unit 10 includes the base plate 11, washer tank 12 and washer pump 13. The outer edge of the base plate 11 is to be engaged with the edge portion of the opening 5 of the back plate 3 when the tank unit 10 is housed in the inner space 4, as best shown in FIG. 4. By such an engagement of the base plate 11 with the back plate 3, the tank unit 10 can be tightly fitted in the inner space 4 of the front bumper 2.

It is preferable that the washer tank 12 is made of an elastic material such as a soft resin so that the whole thereof is restorably deformable. Also, the inlet 14 of the tank 12 is so thick as to increase the rigidity of the inlet 14 and its adjacent portion. The inlet 14 is pushed into the fitting hole 15 formed on a proper portion of the base plate 11 whereby the washer tank 12 is fixed to the base plate 11.

The washer pump 13 is fixed through the bracket 16 to the base plate 11 adjacent to the washer tank 12 in such a way that the length of the hose 17 connected between the washer tank 12 and the washer pump 13 may be shortened.

Before the front bumper 2 is mounted on the vehicle body, the washer tank unit 10 should be preferably set in the front bumper 2. That is to say, after the washer tank 12 and the washer pump 13 are inserted through the opening 5 of the back plate 3 into the inner space 4 of the bumper 2, the base plate 11 is fixed to the back plate 3 by screw means such as the bolt and nut 18. In such an operation, it is advantageous that the washer tank 12 is so elastic and restorably deformable that the tank 12 can be easily inserted through the opening 5 even if the size of the opening 5 is smaller than that of the washer tank 12.

Figure 5:
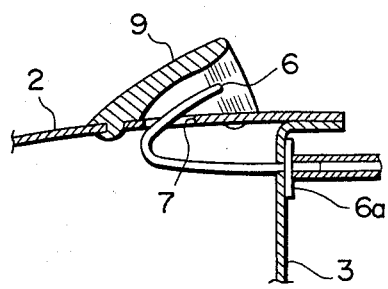
FIG. 5 is a sectional view taken along the line V—V in FIG. 3, showing by way of example an arrangement of washer nozzle means.

As shown in FIG. 5, the washer nozzles 6 are at their base portion fixed through the retainer 6a to the back plate 3. The front portion of the washer nozzle 6 projects through and from the small opening 7 formed on the top of the bumper 2, facing the head lamp 6 as shown in FIG. 1. The hood 9 is provided on the top of the front bumper 2 to cover the front portion of the washer nozzle 6 for the purpose of protection and decoration.

Figure 6:
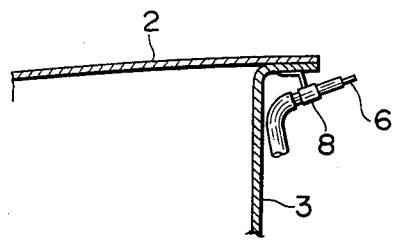
FIG. 6 is a sectional view corresponding to FIG. 5, showing another arrangement of washer nozzle means.
Figure 7:
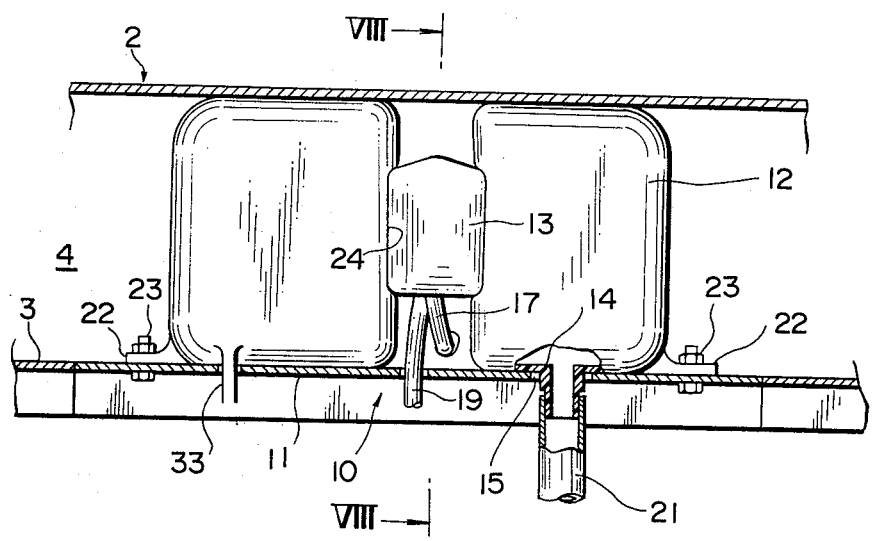
FIG. 7 is a sectional view showing a washer system for an automotive vehicle according to another embodiment of the present invention.
Figure 8:
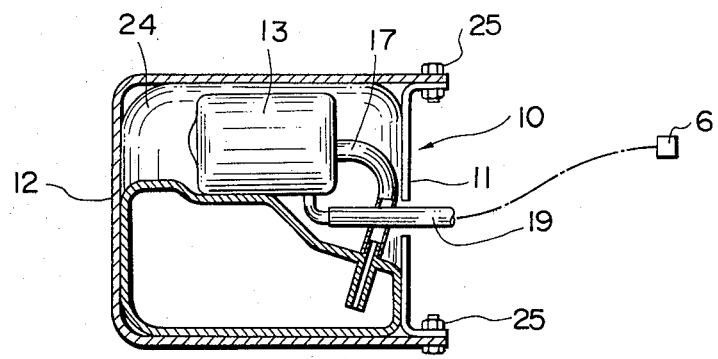
FIG. 8 is a sectional view taken along the line VIII—VIII in FIG. 7.
Figure 9:
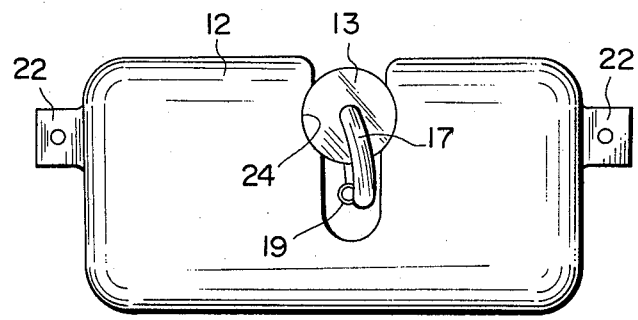
FIG. 9 is a rear side view of a washer tank used in the washer system as shown in FIG. 7.

FIG. 6 shows another arrangement of a washer nozzle. The nozzle 6 is fitted through the bracket 8 on the underside of the upper edge of the front bumper 2. In such a case, it is not necessary to form the small opening 7 for the arrangement of the nozzle on the bumper 2, or to provide hood 9 thereon.

Referring again to FIGS. 2 to 4, designated at 19 is a hose for feeding the well-known washing liquid from the washer pump 13 to the washer nozzles 6. The hose 19 is branched at the connector 30 into a plurality of hoses 19' corresponding to the number of washer nozzles 6 for the purpose of feeding the washing liquid into each nozzle 6. The clamp 20 supports the branched hoses 19' at predetermined positions relative to the bumper 2. According to another aspect of the present invention, a pair of washer tanks may be provided corresponding to the right and left head lamps of the automotive vehicle, in place of using a common washer tank unit.

Figure 11:
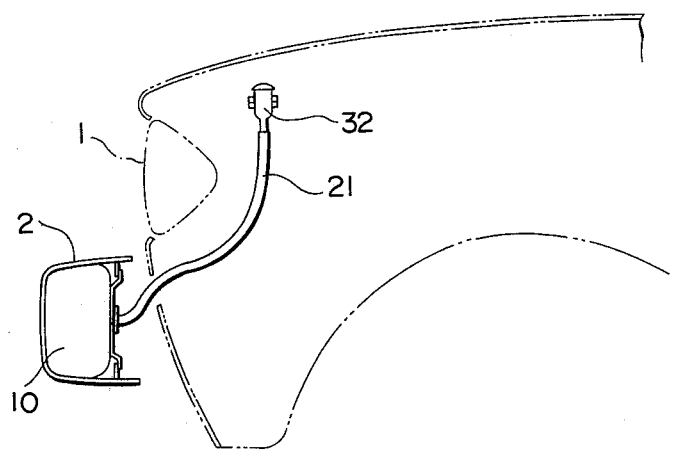
FIG. 11 is a schematic side view showing, partly in section, an automotive vehicle equipped with a washer system according to the present invention.

The hose 21 for the suppliment of the washing liquid is preferably at its one end connected to the stepped end of the inlet 14 of the washer tank 12. The other end of the hose 21 is connected to the bottom of the funnel-shaped member 32 fixed to the wall of the engine room in order to facilitate the pouring of the washing liquid, as shown in FIG. 11. At least a part of the hose 21 can be made of a transparent material so as to facilitate the water level check.

Reference numeral 33 denotes an air vent formed on a shoulder of the washer tank 12.

According to the embodiment as mentioned above, because the washer tank unit 10 is housed in the inner space 4 of the front bumper 2 adjacent to the head lamp 1, it is easy to shorten remarkably the length of the hose means connected between the washer nozzles 6 and the washer tank 12 and particularly the length of the hose 19 connected between the washer nozzles 6 and the washer pump 13. Such decreases the flow resistance of the washing liquid through the hose means. Thus, it becomes possible to make small the size and volume of the washer pump 13. Because the inner space 4 of the front bumper 2 can be effectively used, the volume of the washer tank 12 can be formed as large as possible in the inner sapce 4 of the front bumper 2, due to the fact that the washer tank unit does not interfere with the other parts unlike in the prior art arrangement in which the washer tank unit is placed in the engine room. Another advantage of the present invention is that the tank can be restroably deformed so that it can be easily inserted even through small opening into the inner space of the front bumper.

FIGS. 7 to 10 show another embodiment of the present invention in which the washer tank 12 is made of a hard resin. The flanges 22 are integrally formed on the back edge portions of the washer tank 12 through which flanges the washer tank 12 is fixed to the base plate 11 by the bolt and nut 23. The washer pump 13 is directly mounted on the washer tank 12. The washer tank 12 has at its top a concave portion 24 in which the washer pump 13 is stuffed, thereby to eliminate the fitting bracket 16 used in the first embodiment.

Figure 10:
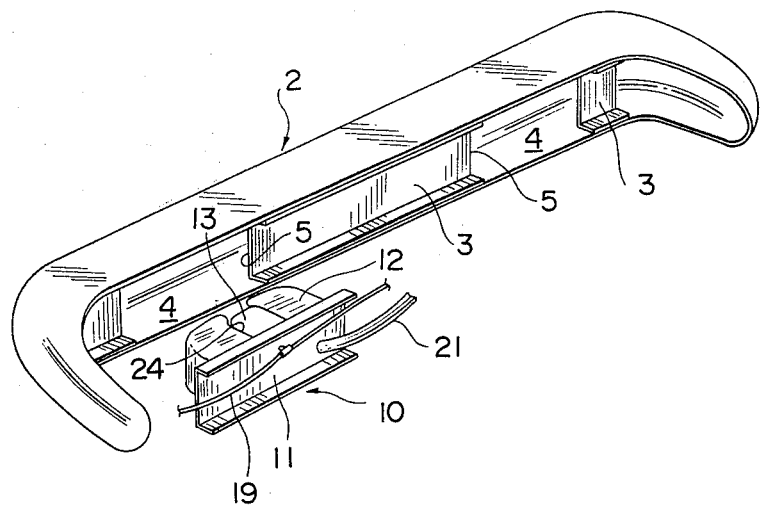
FIG. 10 is a schematic perspective view, partly in a disassembled form, showing a front bumper in combination with the washer system as shown in FIG. 7.

As shown in FIG. 10, the back plate 3 are partly cut off to form the opening 5 between the side edges of the back plates 3 and the upper and lower back ends of the bumper 2 through which the washer tank unit 10 is to be inserted into the inner space of the bumper 2. The base plate 11 of the washer tank unit 10 is tightly set in the said opening 5 and fixed onto the upper and lower back edges of the bumper 2 by the bolt and nut 25. Thus the washer tank unit 10 is housed in the inner space of the bumper 2. The washer nozzles 6 are not shown in FIG. 10 for the simplicity of the figure.

According to the present invention, the inner space of the bumper is effectively used, the washer tank unit 10 being housed therein. Therefore, it does not interfere with other parts unlike in the prior art arrangement of the washer system wherein the washer tank is housed in the engine room. Thus the arrangement of the washer tank can be formed simple, and the volume thereof can be set large within the effective inner space of the bumper 2 without any obstacles of other parts. If the arrangement of the present invention is applied to a washer system for the head lamps of the automotive vehicle, the hose for feeding the washing liquid can be shortened, remarkably. as a result, the flow resistance of the washing liquid can be decreased while a small size and capacity of washer pump can be used.

What is claimed is:

1. A washer system for an automotive vehicle, comprising a bumper fixed on the body of the automotive vehicle, said bumper having an inner space defined therein;

washer nozzle means provided on said bumper;

a washer tank for containing a washing liquid, the washer tank being positioned in the inner space of the bumper;

a washer pump for supplying the washing liquid from said washer tank to said washer nozzle means, the washer pump being placed in the bumper;

hose means connected via said washer pump between said washer tank and said washer nozzle means for feeding said washing liquid; and means for housing said washer tank and said washer pump in the inner space of said bumper.

2. A washer system as defined in claim 1 wherein said housing means comprises a back plate fixed on the back portion of said bumper with a cut portion through which said washer tank and said washer pump is as a unit inserted into the inner space of said bumper.

3. A washer system as defined in claim 2 wherein said cut portion is an opening formed on said back plate, said tank being fixed on the edge portion of said opening of said back plate.

4. A washer system as defined in claim 3 wherein a base plate is fixed on said tank, and said washer pump is fitted through a bracket onto said base plate.

5. A washer system as defined in claim 4 wherein the edge portion of said base plate is fixed to said back plate.

6. A washer system as defined in any one of claims 1 to 5 wherein said washer tank is made of soft resin.

7. A washer system as defined in claim 1 wherein said housing means comprises a base plate on which said washer tank is fixed, the edge portion of said base plate being fixed to the back edge portion of said bumper.

8. A washer system as defined in claim 1 wherein said tank has at its top a concave portion in which said washer pump is arranged.

9. A washer system as defined in claim 7 or 8 wherein said tank is made of a hard resin.

10. A washer system as defined in claim 1 wherein said washer nozzle means is fitted on the top of said bumper, facing a head lamp provided at the front of the automotive vehicle body.

11. A washer system as defined in claim 10 wherein said washer nozzle means is fixed at its base portion onto said housing means, the tip of said washer nozzle means projecting through a small hole formed on the top of said bumper.

12. A washer system as defined in claim 10 wherein said washer nozzle means is fitted through a bracket onto the underside of the back edge portion of said bumper.

* * * * *